United States Patent [19]

Vaughan et al.

[11] Patent Number: 4,691,878
[45] Date of Patent: Sep. 8, 1987

[54] TILT-ROTOR WING FOLD MECHANISM AND METHOD

[75] Inventors: John C. Vaughan, Rockville, Md.; Russel G. Perkins, Jr., Alexandria, Va.

[73] Assignee: The United States of America as represented by the Secretary of the Navy, Washington, D.C.

[21] Appl. No.: 795,303

[22] Filed: Nov. 6, 1985

[51] Int. Cl.$^4$ .......................... B64C 27/28; B64C 3/56
[52] U.S. Cl. ...................................... 244/7 R; 244/49; 416/142
[58] Field of Search ................... 244/6, 7 R, 7 A, 7 C, 244/49, 46, 201, 2; 416/142, 143

[56] References Cited

U.S. PATENT DOCUMENTS

| | | | |
|---|---|---|---|
| 2,679,364 | 5/1954 | Sforza Del Pesaro | 244/7 |
| 3,592,812 | 7/1971 | Glatfelter | 416/142 |
| 3,628,833 | 11/1971 | Ricard | 244/46 |
| 3,721,403 | 3/1973 | Gray et al. | 244/7 |
| 3,971,535 | 7/1976 | Jones | 244/46 |
| 3,986,686 | 10/1976 | Girard | 244/7 A |
| 4,132,374 | 1/1979 | Abell | 244/46 |
| 4,453,426 | 6/1984 | Groutage et al. | 74/2 |

FOREIGN PATENT DOCUMENTS

| | | | |
|---|---|---|---|
| 1947500 | 4/1971 | Fed. Rep. of Germany | 244/46 |
| 2134198 | 3/1972 | Fed. Rep. of Germany | 244/7 C |
| 1075769 | 7/1967 | United Kingdom | 244/7 R |
| 1322169 | 7/1973 | United Kingdom | 244/7 R |

Primary Examiner—Galen Barefoot
Attorney, Agent, or Firm—Luther A. Marsh; Michael J. Gonet

[57] ABSTRACT

A mechanism and method for folding the wing of a tilt-rotor aircraft, having a rotatable load bearing member cooperatively disposed between a high point of the fuselage and the tilt-rotor wing, and a plurality of locking, load bearing pin joints disposed between the fuselage and the tilt-rotor wing, concentric to the rotatable load bearing member, and wherein the tilt-rotor wing may be stored by rotating the tilt-rotor wing, as a single segment, about the rotatable load bearing member, to a position substantially parallel to the fuselage, and wherein the wing may be locked in the flight configuration and the storage configuration with the same pin joints.

16 Claims, 21 Drawing Figures

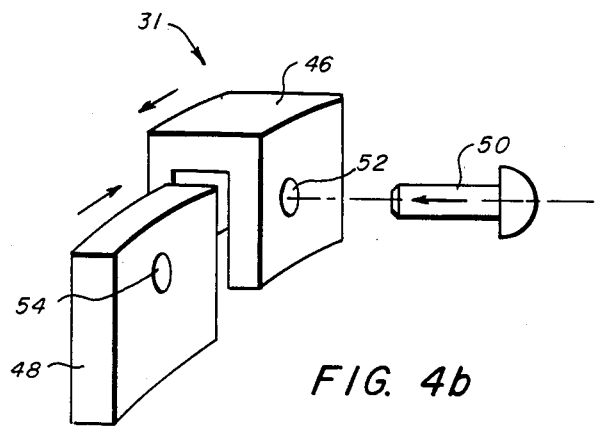
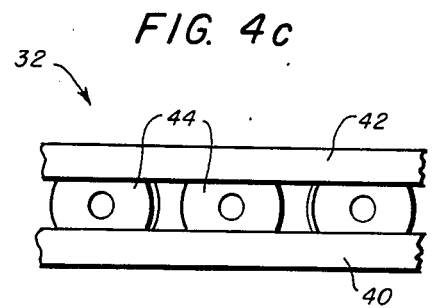
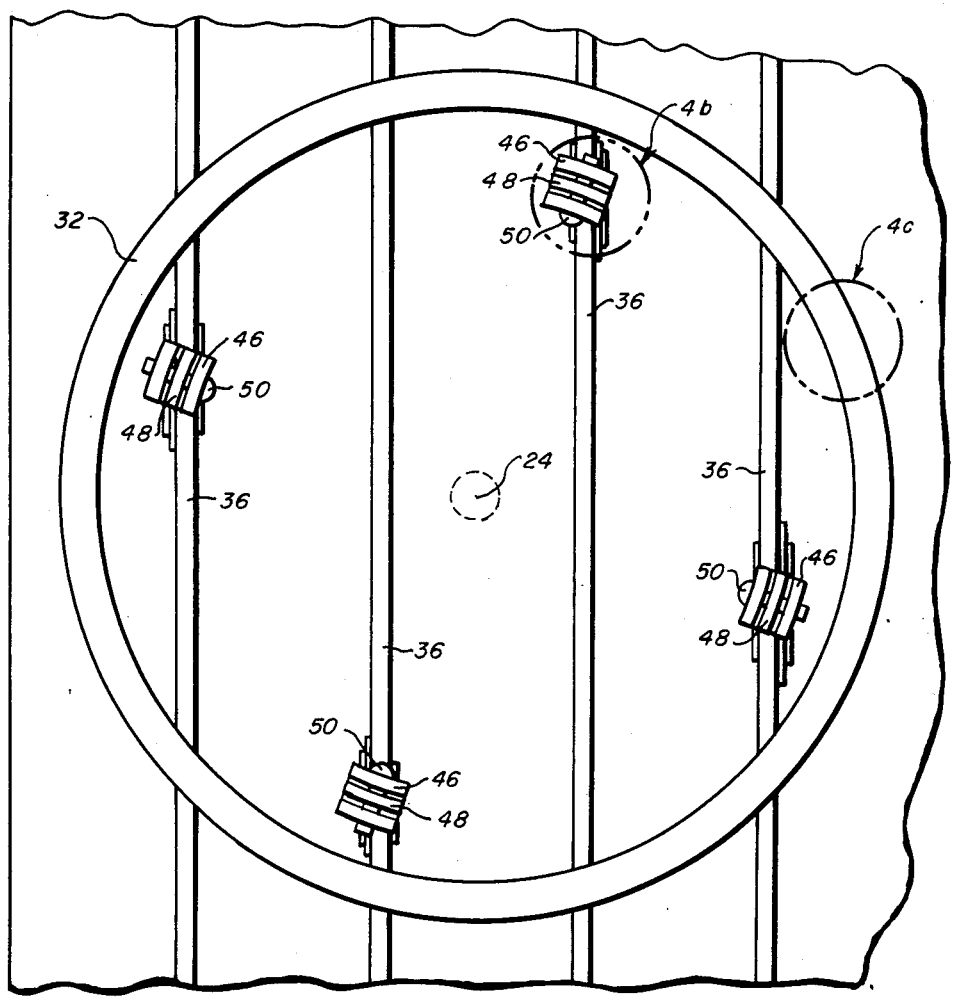

TILT-ROTOR WING FOLD MECHANISM AND METHOD

BACKGROUND OF THE INVENTION

1. FIELD OF THE INVENTION

The present invention relates generally to a tilt-rotor aircraft, and more specifically to a means for folding the wing of a tilt-rotor aircraft for storage.

2. PRIOR ART

Many aircraft are designed with wing folding mechanisms for storage. Aircraft are often subject to limited storage areas, such as on an aircraft carrier, and require a folding wing design for efficient storage. These folding wing mechanisms must be compact, sturdy, and lightweight, so as not to hinder the flight characteristics of the aircraft. It is also desirable that the mechanism be of simple design, easy to operate, and easy to maintain.

Known methods for folding wings generally comprise splitting the wing into three segments. A central segment is affixed to the aircraft fuselage and two outer segments are hinged to the central segment. During flight operations the outer wing segments lock in a normal flight configuration. Upon landing, the outer wing segments are folded in some manner from the normal flight configuration to a storage configuration. The outer wing segments may be folded about the central wing segment and/or the fuselage.

For most typical aircraft, the folding mechanisms of the prior art are satisfactory. In one application, the outer wing segments are hinged outboard of the propulsion systems, and are folded rearward parallel to the fuselage. Each hinge point therefore only supports the weight of the outer wing segment. The aircraft remains stable in a stored configuration as the shift in the aircraft center of gravity is substantial only if the weight of the outer wing segment is a significant fraction of the total vehicle weight. In a second application, the outer wing segments are again hinged outboard of the propulsion systems and are folded over, and generally parallel to, the central wing segment. The segments may either lay flat and substantially overlap, or may be upright, in a triangular configuration. As with the first application, each hinge point supports only the weight of the outer wing segment. The aircraft remains stable in a stored configuration as the shift in the aircraft's center of gravity is usually not substantial.

The known wing folding mechanisms create substantial design penalties for a tilt-rotor aircraft. Firstly, a tilting rotor-prop assembly is mounted on each wing tip. The hinge point of a prior art design would therefore have to withstand the substantial bending moment produced by a wing tip mounted tilt rotor-prop assembly (including the rotors, the engine, and the transmission). Secondly, the hinge must accommodate the tilt-rotor wing cross-shafting, fuel system, and control systems. Thirdly, the folding of the massive tilt-rotor wing segment causes a large shift in the center of gravity of the aircraft. Folding the outer wing segments backward parallel to the fuselage results in a substantial rearward shift in the center of gravity. This shift must be accommodated by the structure and location of the landing gear. Folding the outer wing segments directly over the center wing segment raises the center of gravity, making the stored aircraft less stable. Fourthly, a large force is required to lift the tilt-rotor-prop assembly above and about the hinge point. These structural and weight demands on the hinge point make the traditional wing segment folding mechanisms impractical for a tilt-rotor wing aircraft.

For these and other reasons, the presently known wing folding mechanisms are unsatisfactory for use on a tilt-rotor aircraft. A need exists for a simple, compact, lightweight wing fold mechanism for a tilt-rotor aircraft.

SUMMARY OF THE INVENTION

It is therefore an object of the present invention to provide wing folding capabilities for a tilt-rotor aircraft.

It is another object of the present invention to minimize hinge points in a tilt-rotor aircraft wing fold mechanism.

It is another object of the present invention to maintain the structural integrity and single segment engine cross-shafting in a tilt-rotor aircraft having a wing fold mechanism.

It is another object of the present invention to reduce the weight penalty of a tilt-rotor wing fold mechanism.

It is another object of the present invention to minimize the shift of the center of gravity of the aircraft during tilt-rotor wing folding.

These objects and further advantages are achieved by the present invention, a wing fold mechanism for a tilt-rotor aircraft, comprising a single segment tilt-rotor wing, a support ring rotatably connecting the tilt-rotor wing to a high point on the aircraft fuselage, and pin joints detachably locking the tilt-rotor wing relative to the aircraft fuselage and transferring the ground and flight loads therebetween.

BRIEF DESCRIPTION OF THE DRAWINGS

A more complete appreciation of the invention will become apparent from the following detailed description when considered in conjunction with the accompanying drawings, wherein:

FIGS. 4a through 4c more clearly illustrate the load transferring elements of the wing fold mechanism.

DETAILED DESCRIPTION OF THE PREFERRED EMBODIMENT

Figure 1A:
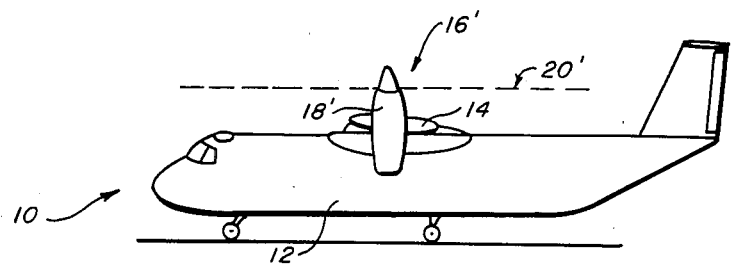
FIGS. 1a through 1c illustrates a tilt-rotor aircraft.
Figure 1B:
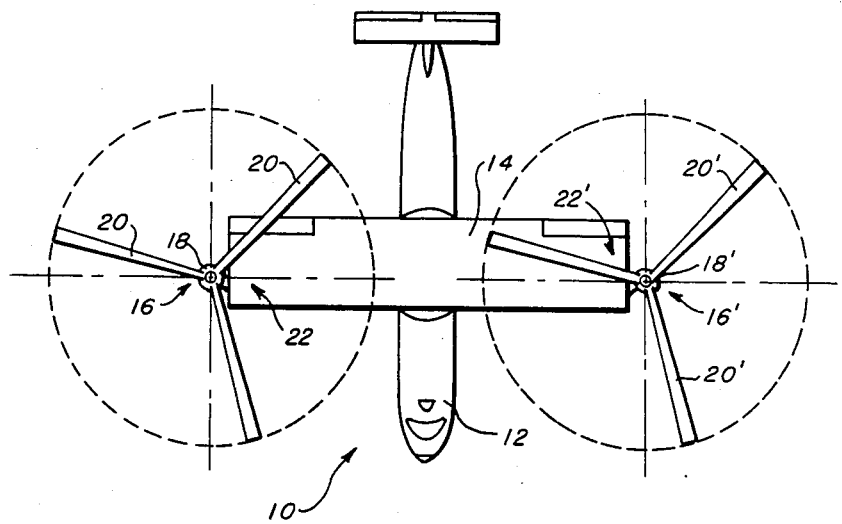
Figure 1C:
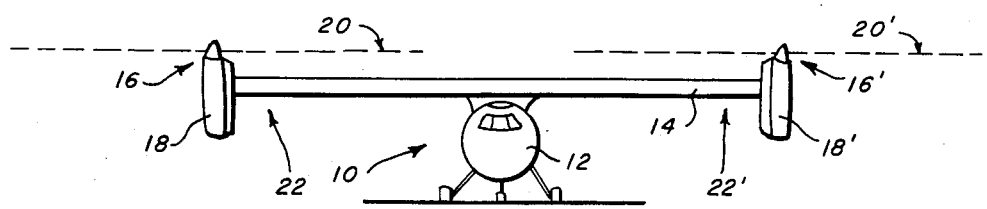

Referring now to the drawings, wherein like reference numerals designate like or corresponding parts throughout the several views, and specifically to FIGS. 1a through 1c, there is generally illustrated a tilt rotor wing aircraft 10, having a fuselage 12 and a single segment tilt-rotor wing 14. A tilting rotor-prop assembly 16, 16' generally comprising an engine 18, 18' and rotor blades 20, 20' is mounted on each wing tip 22, 22' of the tilt-rotor wing 14.

Figure 2A:
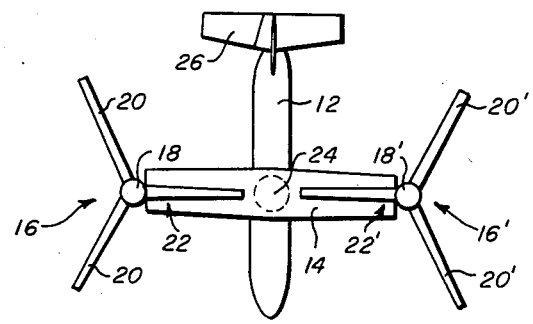
FIGS. 2a through 2c generally illustrate one embodiment of the wing folding method of the present invention.
Figure 2D:
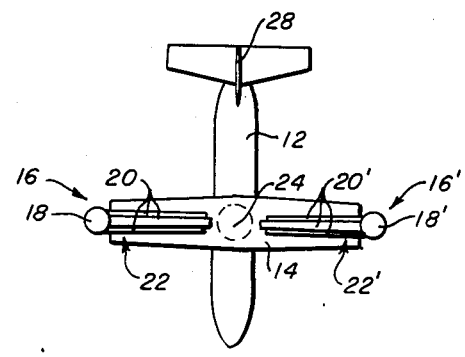
FIGS. 2d through 2f generally illustrate an alternative embodiment of the wing folding method of the present invention.
Figure 2B:
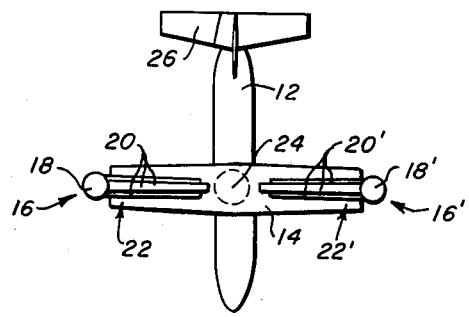
Figure 2E:
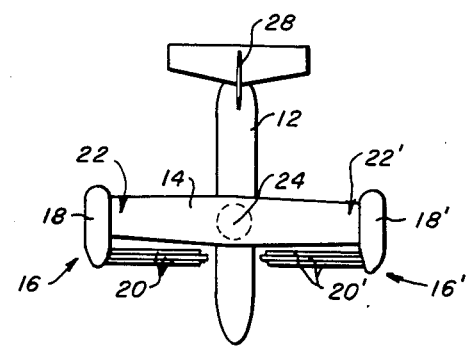
Figure 2C:
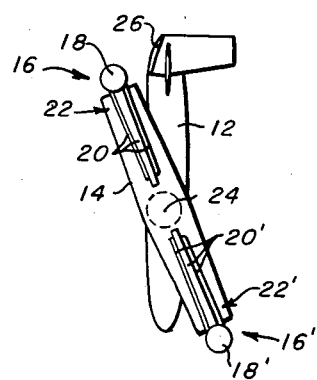

FIGS. 2a through 2c generally illustrate one embodiment of the wing folding method of the present invention. First, each tilt-rotor-prop assembly 16, 16' is rotated to the vertical alignment. Then, the rotor blades 20, 20' are folded inboard (toward the fuselage 12), parallel and adjacent to the upper surface of the tilt-rotor wing 14, by means common to conventional naval helicopters. The entire tilt-rotor wing 14 is then rotated about pivot point 24 to a configuration substantially parallel to the aircraft fuselage 12.

If the length of the tilt-rotor wing 14 is such that it extends to the tail empennage when rotated, a control surface of the tail empennage may be folded by conventional means (eg. hinging) to provide clearance for the tilt-rotor-prop assembly. In FIG. 2c a tail wing section 26 is folded to provide clearance for tilt-rotor-prop assembly 16.

Figure 2F:
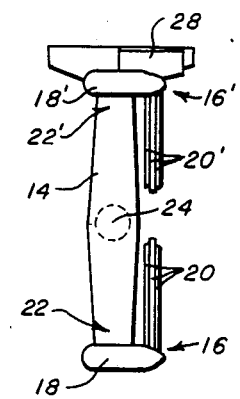

An alternative embodiment of the wing fold method of the present invention is illustrated in FIGS. 2d through 2f. This second embodiment is similar to the first embodiment (supra). First, the rotor blades 20, 21' are folded inboard. Then each tilt-rotor-prop assembly 16, 16' is rotated 90 degrees to the forward flight position, wherein the rotor blades 20, 20' are parallel to, and directly adjacent to, the leading edge of the tilt-rotor wing 14. The entire tilt-rotor wing 14 is then rotated about pivot point 24 to a configuration substantially parallel to the aircraft fuselage 12. As with the first embodiment, a control surface of the tail empennage may be folded by conventional means to provide clearance for the tilt-rotor-prop assembly. In FIG. 2f the tail fin 28 is folded to provide clearance for the tilt-rotor-prop assembly 16'. Note that each of the above wing fold methods may be designed having the tilt-rotor wing 14 fold clockwise or counter-clockwise.

The tilt-rotor wing fold mechanism of the present invention transfers the ground and flight loads between the tilt-rotor wing and the fuselage, provides a pivot point about which the tilt-rotor wing is rotated relative to the fuselage for storage, and maintains the structural integrity of the tilt-rotor wing, with minimal loss of aerodynamic efficiency.

Figure 3A:
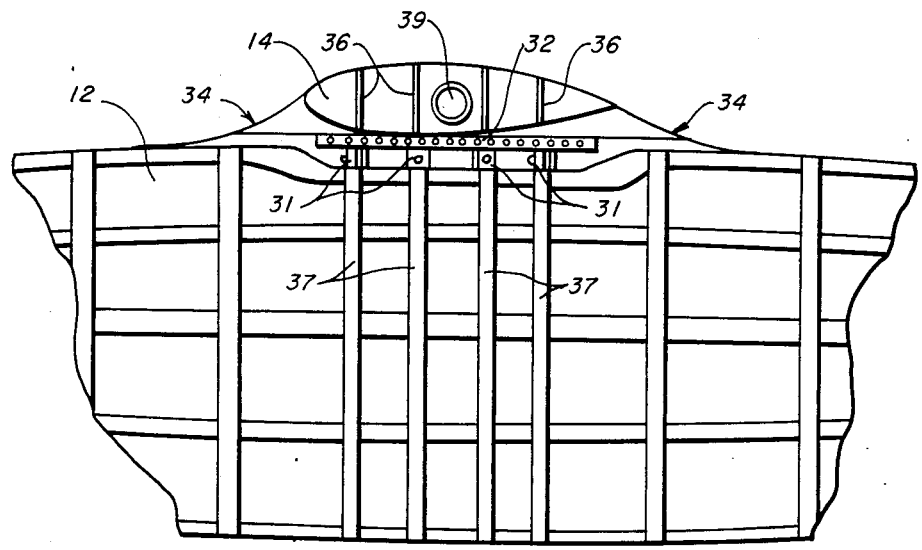
FIGS. 3a and 3b illustrate one embodiment of the wing fold mechanism of the present invention.
Figure 3B:
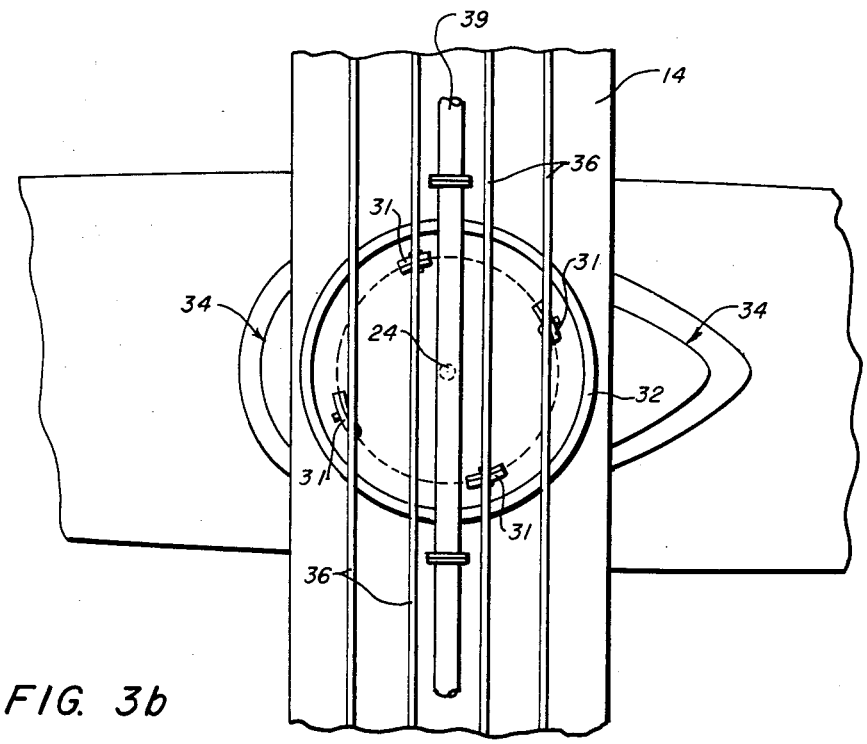

Referring now to FIGS. 3a and 3b, one embodiment of the wing-fold mechanism of the present invention is generally illustrated. Ground and flight loads are transmitted between the tilt-rotor wing 14 and the fuselage 12 through a plurality of load bearing pin joints 31 in cooperation with a rotatable load bearing member 32. The load bearing pin joints 31 are disposed between the wing spars 36 and aircraft fuselage ribs 37. They constitute the primary load transfer path. The rotatable load bearing member, a support ring 32, is disposed concentric to the pivot point 24 and rotatably interconnects the tilt-rotor wing 14 and the fuselage 12. It constitutes a secondary load transfer path. A fairing 34, located between the tilt-rotor wing 14 and fuselage 12, maintains a clean aerodynamic design for the tilt-rotor wing fold mechanism. The engine cross shafting 39 is disposed above the wing fold mechanism. The engine cross-shafting 39 therefore remains intact, as a single segment, during wing folding.

The number and spacing of the load bearing pin joints 31 is generally arbitrary. The number (and size) required is determined by the ground and flight loads to be transferred. The pin joints 31 may be disposed radially interior to the support ring 32 (as illustrated in FIG. 3b) or radially exterior to the support ring 32 (not shown). The pin joints 31 may be arbitrarily located, however in the preferred embodiment, the pin joints 31 are disposed equidistant from the pivot point 24 (on a circle of radius R). This design allows the same pin joints 31 to lock the tilt-rotor wing 14 in both the flight configuration and the storage configuration (infra). Note also that it is not necessary to lock all pin joints 31 in the storage configuration. One simple design, having four load bearing pin points 31, is illustrated herein. Numerous other combinations will be clear to those skilled in the art.

FIGS. 4a through 4c more clearly illustrate one embodiment of the load transferring elements of the wing fold mechanism. FIG. 4a is a bottom view of the wing fold mechanism. FIG. 4b illustrates an exploded view of one embodiment of a load bearing pin joint 31. FIG. 4c illustrates an enlarged view of one embodiment of the rotatable load bearing member, a support ring 32.

In the embodiment illustrated in FIG. 4b, each load bearing pin joint 31 comprises an upper joint member 46, a lower joint member 48, and a locking pin 50. Each upper joint member 46, a female joint member, is provided with a pin hole 52, and is rigidly affixed to a wing spar 36 by welding (or other conventional means). Each lower joint member 48, a male joint member, is provided with a corresponding pin hole 54, each of said pin holes 54, alignable with each of pin holes 52. Each lower joint member 48 is rigidly affixed to a fuselage rib 37 by welding (or other convention means). Each pin joint 31 may therein be locked in place by inserting locking pin 50 through an aligned pair of pin holes 52 and 54. The load bearing pin joints 31 are disposed equidistant from the center of rotation 24, and each pin joint 31 is shaped such that each lower joint member 48 may pass through, and lock with, each upper joint member 46. Therefore, when the tilt-rotor wing 14 is rotated relative to the fuselage, each upper joint member 46 is rotated relative to each lower joint member 48. With proper selection of the central angles between pairs of pin joint members and their radial distance from the center of rotation 24, the same set of pin joints 31 can lock the tilt-rotor wing 14 in both the normal flight configuration and the folded wing storage configuration, for any chosen angle of wing rotation.

Figure 5A:
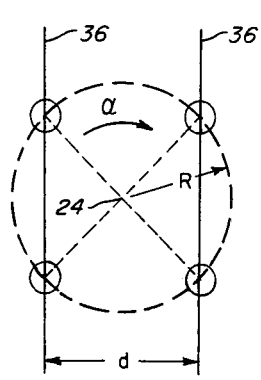
FIGS. 5a and 5b illustrate the relationship of the angle of wing rotation to the placement of the primary pin joints.
Figure 5B:
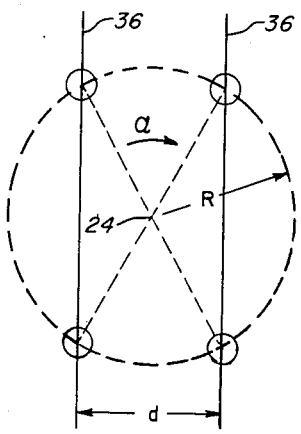

FIGS. 5a and 5b illustrate the relationship of the angle of wing rotation to the placement of the pin joints 31. The angle of wing rotation, $\alpha$, is equal to $2 \sin^{-1}(d/2R)$, where d is the distance between wing spars 36 and R is the distance from the pivot point 24 to each pin joint 31. For an angle of rotation of 90 degrees, $R = (\sqrt{2}/2)d$, as shown in FIG. 5a. This corresponds to the tilt-rotor wing 14 being stored substantially parallel to the aircraft fuselage 12. For angles of rotation less than 90 degrees, $R > (\sqrt{2}/2)d$, as shown in FIG. 5b. By changing the radius, R, the intersection of pin joints 31 along the wing spars 36 will change, at different rates. Therefore the angle of wing rotation from the flight configuration to the storage configuration may be controlled by selectively varying the distance from the pivot point 24 to the load bearing pin joints 31, offsetting the pivot point 24 from a point equidistant from the wing spars 36, using additional pin joints 31, or a combination of these variables. FIGS. 5a and 5b illustrate this relationship for a two spar wing. The effect of the variation is similar for a multi-spar wing.

Figure 6:
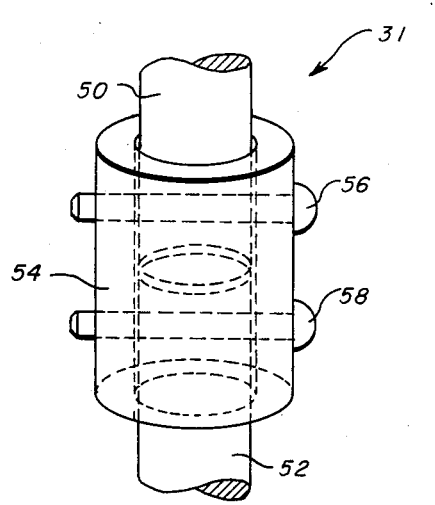
FIG. 6 illustrates an alternative embodiment of the primary pin joints.

FIG. 6 illsutrates an alternative embodiment of a load bearing pin joint 31. The pin joint 31 is shown in a locked configuration. Each pin joint 31 comprises as upper joint member 50, a lower joint member 52, a sleeve 54, and upper and lower locking pins 56, 58. Upper joint member 50 and lower joint member 52 are rigidly affixed to the wing spars and fuselage ribs (respectively) by welding (or other conventional means, as supra). During wing rotation, locking pins 56,58 are removed, and sleeve 54 slides down onto lower joint member 52, allowing the upper and lower joint members to pass freely. The wing may then be rotated until the load bearing pin joint members realign in the desired configuration. For flight or storage, each pin joint 31 is locked by reversing the above procedure.

The support ring 32, as illustrated in FIG. 4c, comprises a lower ring member 40, an upper ring member 42, and a plurality of bearing members 44. The lower ring member 40 is rigidly affixed to the fuselage ribs (not shown) by welding (or other conventional means). The upper ring member 42 is rigidly affixed to the wing spars 36 by conventional means. Bearing members 44 are cooperatively disposed between the lower ring member 40 and the upper ring member 42, wherein the ring members 40,42 are rotatably connected. The support ring 32 is designed to support the ground load of the single segment tilt-rotor wing 14 during wing-folding and storage. (The ground load includes the tilt-rotor wing 14, the fuel tanks, prop-rotor asesmblies, engine cross shafting, and any other attachments). The support ring must also withstand the torque and friction forces associated with the rotation of the tilt-rotor wing 14.

Figure 7:
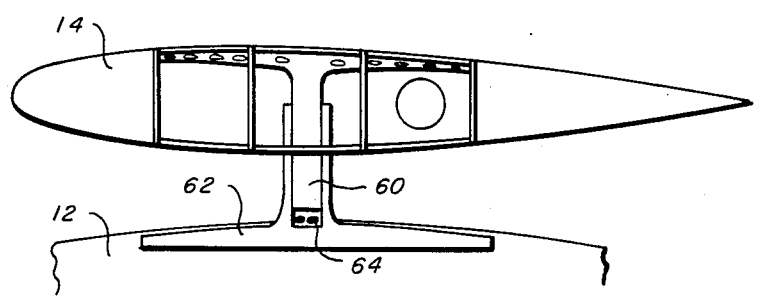
FIG. 7 illustrates an alternative embodiment of the rotatable load bearing member.

FIG. 7 illustrates an alterantive embodiment of the rotatable load bearing member comprising an inner shaft 60, rigidly affixed to the tilt-rotor wing 14, and an outer shaft 62, rigidly affixed to the fuselage 12. The inner and outer shafts are concentric, the outer shaft 62 supporting the inner shaft 60 on bearings 64, wherein the upper shaft 60 may be rotated relative to the lower shaft 62.

The folding method and mechanism of the present invention requires sufficient clearance for the tilt-rotor wing 14 to rotate relative to the aircraft fuselage 12. This wing fold design may be accommodated by disposing the tilt-rotor wing 14 on a high point of the fuselage 12. To maintain the aerodynamic properties of the aircraft it is desirable to have a fairing between the fuselage 12 and tilt-rotor wing 14.

Figure 8A:
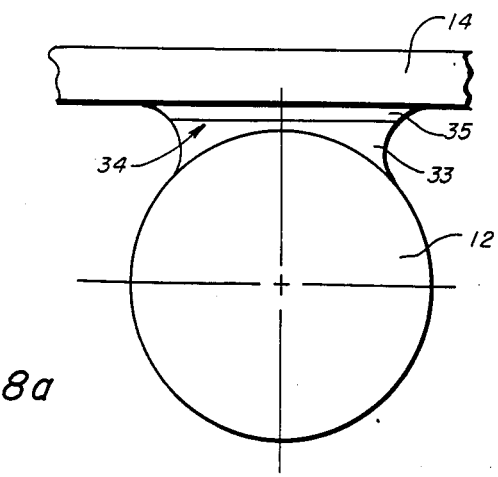
FIGS. 8a through 8c illustrate a fairing design for the present invention.
Figure 8B:
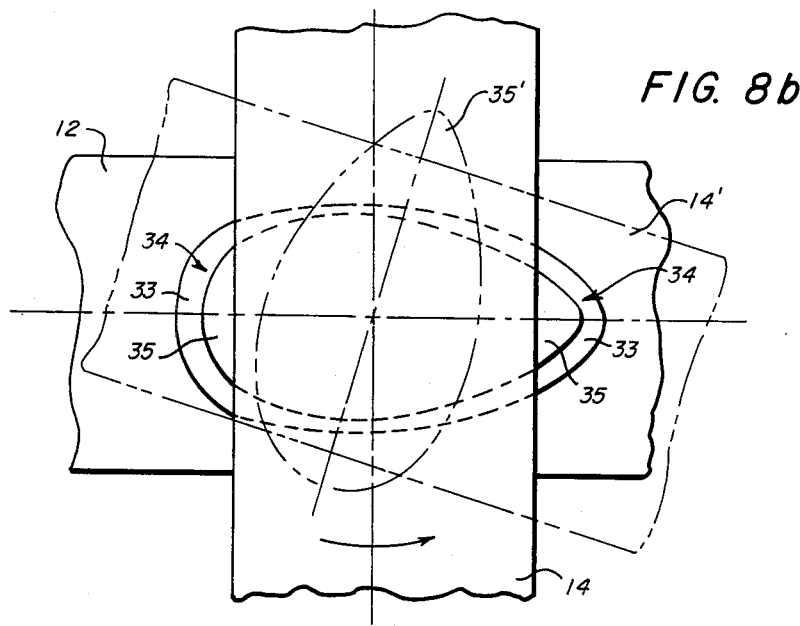
Figure 8C:
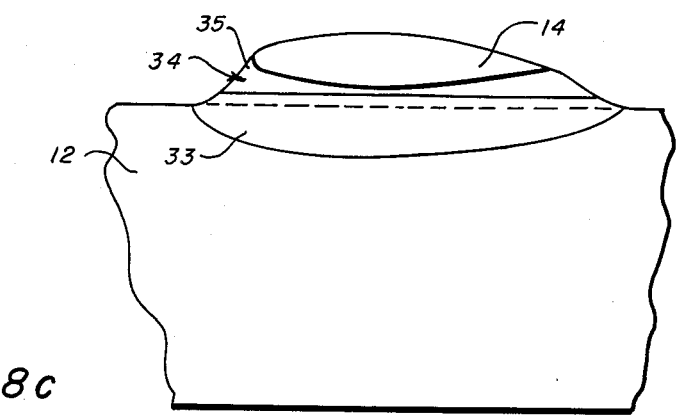

Referring now to FIGS. 8a through 8c, a fairing 34 for the preferred embodiment is illustrated. FIG. 8a is a front view of the fairing 34 in flight configuration. The fairing 34 is shown comprising a lower half 33 affixed to the fuselage 12 and an upper half 35 affixed to the tilt-rotor wing 14. This split design maintains a clean aerodynamic flow during flight, and permits unobstructed rotation of the tilt-rotor wing 14 relative to the fuselage 12 for storage. FIG. 8b is a top view of the preferred embodiment illustrating the fairing 34 in the flight configuration (non-primed index numerals) and storage configuration (primed index numerals). FIG. 8c is a side view of the preferred embodiment, illustrating an aerodynamic design fore and aft of the tilt-rotor wing 14. The fairing 34 as shown in FIGS. 8a through 8c is illustrative only, numerous aerodynamic design modifications may be substituted therefore.

Numerous modifications and variations of the present invention are possible in light of the above teachings. It is therefore to be understood that within the scope of the appended claims, the invention may be practiced otherwise than as specifically described herein.

What is claimed:

1. A wing fold mechanism for a tilt-rotor aircraft, said aircraft including a fuselage, a single-segment tilt-rotor wing having a tilting rotor-prop assembly on each wing tip and engine cross-shafting therebetween, and a tail empennage, comprising:
   a rotatable load bearing member, disposed between the tilt-rotor wing and a high point of the fuselage, wherein the tilt-rotor wing is rotatably affixed to the high point of the fuselage;
   at least one load bearing pin joint, each having an upper pin joint member rigidly affixed to the tilt-rotor wing, a lower pin joint member rigidly affixed to the fuselage, and a locking means, detachably connecting said upper and lower pin joint members, wherein each load bearing pin joint transfers the ground and flight loads between the tilt-rotor wing and the fuselage; and,
   wherein the tilt-rotor wing is reversably rotatable from a flight configuration, perpendicular to the fuselage, to a storage configuration, substantially parallel to the fuselage, and may be locked in each of said configurations.

2. The apparatus recited in claim 1, wherein said rotatable load bearing member comprises:
   an upper ring member, rigidly affixed to the wing spars, and depending from the tilt-rotor wing;
   a lower ring member, rigidly affixed to the fuselage ribs, and appending from said high point of the fuselage; and,
   a plurality of bearing members disposed between said upper ring member and said lower ring member, wherein said ring members are rotatably connected.

3. The apparatus recited in claim 1, wherein said rotatable load bearing member comprises:
   an inner cylindrical shaft, rigidly affixed to the tilt-rotor wing, and depending therefrom;
   an outer cylindrical shaft, concentrically disposed about and supporting said inner shaft, rigidly affixed to the fuselage ribbing, and appending from said high point of the fuselage; and,
   a plurality of bearing members disposed between said inner and outer shaft members, wherein said shaft members are rotatably mounted.

4. The apparatus recited in claim 1, wherein the number of load bearing pin joints is four.

5. The apparatus recited in claim 4, wherein the load bearing pin joints are disposed radially and concentric to said rotatable load bearing member, each upper pin joint member, a female joint member, being rigidly affixed to a wing spar and provided with a locking pin hole, each lower pin joint member, a male joint member, being rigidly affixed to a fuselage rib and provided with a corresponding locking pin hole, and each locking means being a locking pin, wherein each male joint member may rotate through, and be locked with, each female joint member, and wherein the same pin joint members can lock the wing in a flight configuration and a storage configuration.

6. The apparatus recited in claim 4, wherein the load bearing pin joints are disposed radially and concentric to said rotatable load bearing member, each upper pin joint member, a male joint member, being ridigly affixed to a wing spar and provided with a locking pin hole, each lower pin joint member, also a male joint member, being rigidly affixed to a fuselage rib and provided with a locking pin hole, and each locking means comprising a sleeve, slidably encompassing said upper and lower pin joint members and provided with corresponding upper and lower pin holes, and upper and lower locking pins, wherein when unlocked, each upper pin joint member may rotate past, and allign with, each lower pin joint member, and wherein the same pin joint members can lock the wing in a flight configuration and a storage configuration.

7. The apparatus recited in claim 1, the tail empennage further comprising:
   a folding control surface, wherein during storage the control surface is folded to provide additional clearance for the tilt-rotor-prop assembly.

8. A method for folding the wing of a tilt-rotor-aircraft, said aircraft including a fuselage, a single segment tilt-rotor wing having a tilting rotor-prop assembly on each wing tip and engine cross-shafting therebetween, a tail empennage having a foldable control surface, a rotatable load bearing member disposed between the wing and the fuselage, and at least one lockable load bearing pin joint radially disposed concentric to the rotatable load bearing member, said method comprising the steps of:
   folding the rotors of each tilt-rotor-prop assembly inboard;
   unlocking each load bearing pin joint;
   rotating the single segment tilt-rotor wing relative to the fuselage on the rotatable load bearing member to a configuration substantially parallel to said fuselage; and
   locking each load bearing pin joint.

9. The wing fold method recited in claim 8, further comprising the step of:
   folding said foldable tail empennage control surface to provide additional clearance for the tilting rotor-prop assembly during storage.

10. A wing fold mechanism for a tilt-rotor aircraft, said aircraft including a fuselage, a one piece single-segment tilt-rotor wing having a tilting rotor-prop assembly on each wing tip and engine cross-shafting therebetween, and a tail empennage, comprising:
   a rotatable load bearing member, disposed between the tilt-rotor wing and a high point of the fuselage, wherein the tilt-rotor wing is rotatably affixed to the high point of the fuselage;
   at least one load bearing pin joint, each having an upper pin joint member rigidly affixed to the tilt-rotor wing, a lower pin joint member rigidly affixed to the fuselage, and a locking means, detachably connecting said upper and lower pin joint members, wherein each load bearing pin joint transfers the ground and flight loads between the tilt-rotor wing and the fuselage; and,
   wherein the tilt-rotor wing is reversibly rotatable from a flight configuration, perpendicular to the fuselage to a storage configuration, substantially parallel to the fuselage, and may be locked in each of said configurations.

11. The apparatus recited in claim 10, wherein said rotatable load bearing member comprises:
   an upper ring member, rigidly affixed to the wing spars, and depending from the tilt-rotor wing;
   a lower ring member, rigidly affixed to the fuselage ribs, and appending from said high point of the fuselage; and,
   a plurality of bearing members disposed between said upper ring member and said lower ring member, wherein said ring members are rotatably connected.

12. The apparatus recited in claim 10, wherein said rotatable load bearing member comprises:
   an inner cylindrical shaft, rigidly affixed to be tilt-rotor wing, and depending therefrom;
   an outer cylindrical shaft, concentrically disposed about and supporting said upper shaft, rigidly affixed to the fuselage ribbing, and appending from said high point of the fuselage; and,
   a plurality of bearing members disposed between said inner and outer shaft members, wherein said shaft members are rotatably mounted.

13. The apparatus recited in claim 10, wherein the number of load bearing pin joints is four.

14. The apparatus recited in claim 13, wherein the load bearing pin joints are disposed radially and concentric to said rotatable load bearing member, each upper pin joint member, a female joint member, being rigidly affixed to a wing spar and provided with a locking pin hole, each lower pin joint member, a male joint member, being rigidly affixed to a fuselage rib and provided with a corresponding locking pin hole, and each locking means being a locking pin, wherein each male joint member may rotate through, and be locked with, each female joint member, and wherein the same pin joint members can lock th wing in a flight configuration and a storage configuration.

15. The apparatus recited in claim 13, wherein the load bearing pin joints are disposed radially and concentric to said rotatable load bearing member, each upper pin joint member, a male joint member, being rigidly affixed to a wing spar and provided with a locking pin hole, each lower pin joint member, also a male joint member, being rigidly affixed to a fuselage rib and provided with a locking pin hole, and each locking means comprising a sleeve, slidably encompassing said upper and lower pin joint members and provided with corresponding upper and lower pin holes, and upper and lower looking pins, wherein when unlocked, each upper pin joint member may rotate past, and align, with, each lower pin joint member, and wherein the same pin joint members can lock the wing in a flight configuration and a storage configuration.

16. The apparatus recited in claim 10, the tail empennage further comprising:
   a folding control surface, wherein during storage the control surface is folded to provide additional clearance for the tilt-rotor-prop assembly.

* * * * *